(No Model.)
G. H. ZIPH.
CULINARY VESSEL.
No. 315,989. Patented Apr. 14, 1885.
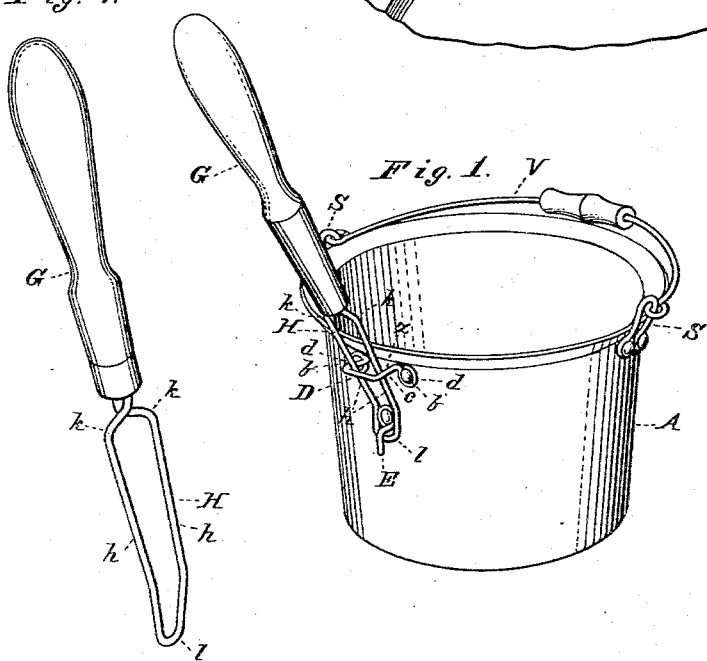
WITNESSES
Villette Anderson
Phil C. Masi
INVENTOR
Geo. H. Ziph.
by Anderson & Smith
his ATTORNEYS

UNITED STATES PATENT OFFICE.

GEORGE H. ZIPH, OF ST. JOSEPH, MISSOURI.

CULINARY VESSEL.

SPECIFICATION forming part of Letters Patent No. 315,989, dated April 14, 1885.

Application filed July 10, 1884. (No model.)

*To all whom it may concern:*

Be it known that I, GEORGE H. ZIPH, a citizen of the United States, residing at St. Joseph, in the county of Buchanan and State of Missouri, have invented certain new and useful Improvements in Culinary Vessels; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a perspective view. Fig. 2 is a vertical section. Fig. 3 is a detail view. Fig. 4 is a perspective view of the detachable handle.

This invention has relation to culinary vessels; and it consists in the construction and novel arrangement of devices, as hereinafter set forth, and pointed out in the appended claims.

In the accompanying drawings, the letter A designates the side wall of the pot, which is formed from a skelp of wrought-iron or steel plate, the meeting edges being welded together, as at $a$, to form the side seam. The body is slightly tapering from top to bottom, and its lower edge is rolled inward to form a bearing-flange, B. The upper part of the vessel being of greater diameter than the lower part, the bottom C, which is usually made of similar metal, after it has been cut to fit, is placed in position from above upon the flange B, and is then brazed permanently in place. The brazing is preferably done with aluminium, because this metal will not oxidize when brought in contact with water or steam. The upper edge of the vessel is rolled outward in curved form to provide a lip-flange, Z. When formed, the vessel is tinned or galvanized.

Below the lip-flange Z, on the outside, the vessel is provided with the wire ears S, which are riveted to the wall of the vessel at diametrically-opposite points, and serve to receive the loop from ends of the bail V.

Between the ears S, and just below the lip-flange of the vessel, a brace-loop, D, is attached thereto, said brace-loop consisting of a bracket portion, $c$, projecting beyond the lip-flange horizontally, and terminating in the eyes $d$, through which pass the rivets $b$, whereby it is fastened to the wall of the vessel.

Below the brace-loop on the wall of the vessel is secured a downwardly-turned hook, E, which consists usually of a short wire having an eye, which is riveted to the wall of the vessel. On the opposite side of the vessel, near its base, is secured a similar downwardly-turned hook, F, for the purpose of lifting the bottom end of the vessel when emptying its contents.

G represents the detachable handle having the loop-form wire blade H. The wire branches $h$ of the blade incline toward each other a little from the base-shoulders $k$, to the end portion or point bend $l$; and while the shoulders $k$ are farther apart than the arms $z$ of the bracket $c$, the main portion of the wire blade is of proper size to be introduced through the bracket-loop downward far enough to engage the hook E. In this position it is stopped by the broader shoulder portions, which therefore form a guide to facilitate the application of the loop to said hook. The arms $z$ of the brace-loop incline toward each other a little as they extend inward to the wall of the vessel, so that the outer portion of the bracket is the broadest; and therefore when the wire blade is engaged with the hook and loop it will be held with its wooden handle portion in oblique position.

I am aware that it is not new in the manufacture of wash-basins to provide an interior bottom flange, a bottom adapted to rest on the flange, and attached thereto by solder.

Having described this invention, what I claim, and desire to secure by Letters Patent, is—

1. The culinary vessel having a wrought-iron or steel plate side wall welded at its meeting edges to form the side seam rolled outward at its upper edge to form a lip-flange, Z, rolled inward at its lower edge to form a bearing-flange, B, and the bottom C, brazed to the bearing-flange B, upon which it is placed from above downward, substantially as specified.

2. The culinary vessel described, having the horizontally-projecting brace-loop D near its upper edge, and below the same on its sidewall the downwardly-projecting hook E, substantially as specified.

3. The culinary vessel having the bail-ears S and bail V, the downwardly-turned hooks E and F on opposite sides, and the brace-loop D above the hook E, substantially as specified.

4. The combination, with the brace-loop and the hook below it, of the detachable handle having a loop, substantially as specified.

In testimony whereof I affix my signature in presence of two witnesses.

GEORGE H. ZIPH.

Witnesses:
R. MAPSTONE,
H. N. CORNELL.